Aug. 14, 1945.　　　W. J. ZENNER　　　2,382,596
MECHANICAL EXTENSOR
Filed July 23, 1943　　　6 Sheets-Sheet 1

INVENTOR
WALTER J. ZENNER
BY
*H. B. Whitfield*
ATTORNEY

Aug. 14, 1945.  W. J. ZENNER  2,382,596
MECHANICAL EXTENSOR
Filed July 23, 1943  6 Sheets-Sheet 2

INVENTOR
WALTER J. ZENNER
BY
*H. B. Whitfield*
ATTORNEY

Aug. 14, 1945.  W. J. ZENNER  2,382,596
MECHANICAL EXTENSOR
Filed July 23, 1943  6 Sheets-Sheet 3

INVENTOR
WALTER J. ZENNER
BY
*J. H. B. Whitfield*
ATTORNEY

Aug. 14, 1945.　　　W. J. ZENNER　　　2,382,596
MECHANICAL EXTENSOR
Filed July 23, 1943　　　6 Sheets-Sheet 4

INVENTOR
WALTER J. ZENNER
BY
*H. B. Whitfield*
ATTORNEY

Aug. 14, 1945.  W. J. ZENNER  2,382,596
MECHANICAL EXTENSOR
Filed July 23, 1943  6 Sheets-Sheet 5

INVENTOR
WALTER J. ZENNER
BY
ATTORNEY

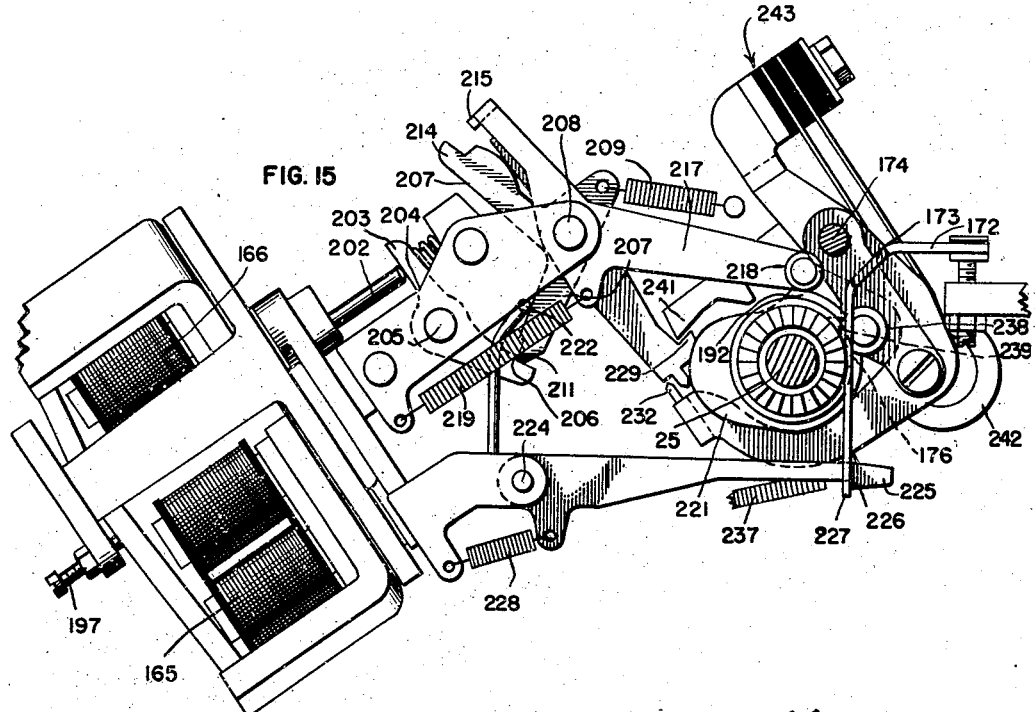
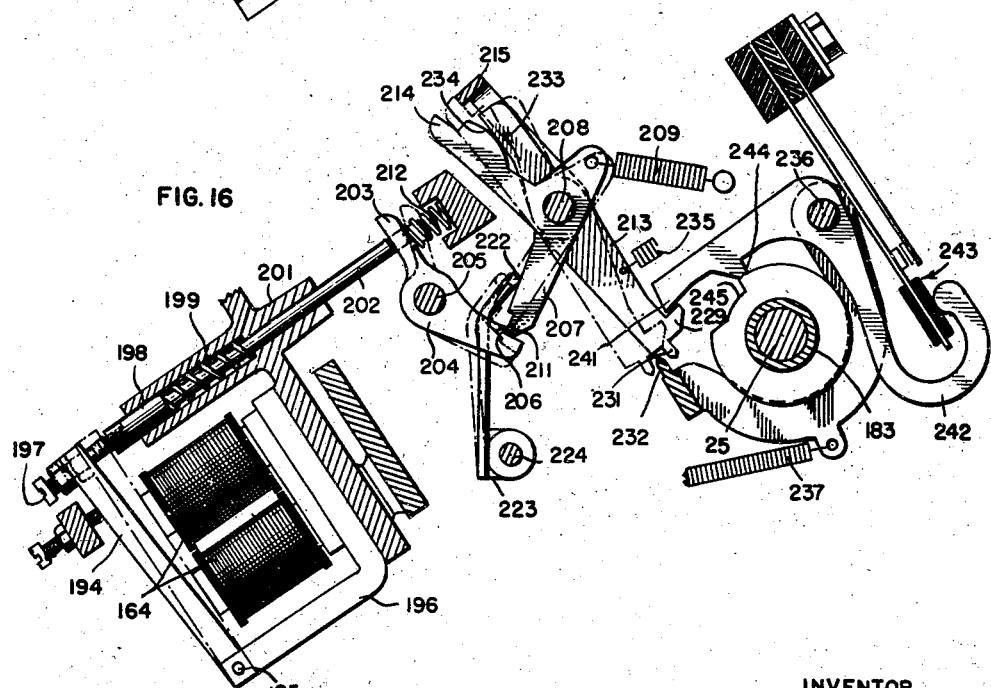

Patented Aug. 14, 1945

2,382,596

UNITED STATES PATENT OFFICE 2,382,596

MECHANICAL EXTENSOR

Walter J. Zenner, Des Plaines, Ill., assignor to Teletype Corporation, Chicago, Ill., a corporation of Delaware Application July 23, 1943, Serial No. 495,857

10 Claims. (Cl. 178—71)

The present invention relates to telegraph translating apparatus and more particularly to signal repeating apparatus for repeating permutation code signals in both directions as between a multiplex circuit and a simplex extension circuit.

In the transmission of communications over a multiplex system and thereafter through a simplex system, it is desirable to afford to branch or outlying subscribers' stations on said simplex system a flexible intercommunication service, whereby signals may be received and transmitted through both types of systems to a remote station at a high rate of speed, notwithstanding the inherent variations of the two different types of system. Accordingly, it is proposed to provide at intermediate stations unitary translating apparatus constituting a signal relaying device which is responsive to signals of either class for converting such signals to the other class so as to be capable of transmission over the type of system thereafter encountered. In other words, as between a multiplex system and a simplex system, unitary equipment is provided which will convert or modify the simplex signals transmitted over its circuit into multiplex signals for retransmission over the multiplex channel, and which will also modify the multiplex signals received from the multiplex channel into simplex signals (adding start and stop impulses) for retransmission over the simplex circuit.

Within the foregoing defined communication services, it is proposed to provide a signal repeating apparatus having the afore-described general objective which will enable the transmission of signals in both directions at maximum signaling efficiency so that both classes of telegraph service may be employed coextensively at maximum signaling efficiency.

Accordingly, a principal object of the present invention is to provide in a unitary structure, apparatus for converting multiplex and simplex signals into signals of the opposite class under the control of interconnecting line mechanism so that intercommunication between the respective types of signaling circuits may be effected with a minimum of delay.

In the attainment of the foregoing described and other objects, the present invention proposes a panel-mounted apparatus having a single principal drive shaft with subordinated clutch driven mechanisms, one for translating simplex signals into multiplex signals, and conversely another for translating multiplex signals into simplex signals. In the simplex-to-multiplex translating portion of the unit, a single line magnet is provided which responds to the successive start-stop impulses of a simplex circuit. These impulses are distributed in accordance with the operation of a rotary distributor mechanical sword and T-lever translating mechanism to a first set of a series of three sets of signal storage members.

The first set of said series includes the sword and T-levers which in turn cause each permutation code signal to be transferred to a set of bail-latched intermediate storage members. A clutch sleeve controlled by two release impulses is provided in connection with this translating mechanism, and in response to a first impulse communicated by the start-stop distributor shaft the secondary sleeve is released to a position for subsequent supervision under the control of an impulse generated by the local multiplex distributor. This impulse may be the same as is conventionally provided with multiplex distributors for the operation of a local multiplex transmitter or similar translating the mechanisms. In accordance with the release of the sleeve which is under the control of the multiplex supervisory impulse, a final signal transfer in said series is effected permitting the storage of a five unit code impulse to advance to a third and final set of storage elements to be then cleared out, indicating that the signal has been relayed over the multiplex distributor segments.

The successive transfer of the five unit permutation code signal in the simplex to multiplex translating mechanism is accordingly determined by the speed of the simplex distributor which characteristically is operated at a marginally slower rate than that of conventional multiplex communication signal apparatus.

In the multiplex-to-start-stop translating portion of the system, apparatus is provided which in response to a supervisory impulse under the control of the local multiplex receiving distributor causes a five unit permutation code signal to be stored upon a primary set of storage levers. Thereafter the signal is advanced to a secondary set of storage levers which is equipped with storage latch releasing elements that supervise the performance of a set of start-stop permutation code controlling gooseneck levers generally after the manner of the conventional keyboard transmitter design. In the latter translating device, means are provided which respond to the primary storage levers for sensing the displacement of any one of such levers from the normally prevailing all-spacing signal condition and thereby controlling the rotation of a power clutch. In other words, this means is designed to prevent the clutching of the start-stop distributor apparatus in response to an all-space signal which is the normal non-signaling condition in a multiplex communication system, thereby preventing the repetition of this signal which denotes the idle condition during the dormant multiplex interval relating to the particular transmission channel.

In the attainment of these and other objects of the present invention, reference will now be had to the accompanying drawings and to the following detailed specification wherein like reference characters designate corresponding parts throughout, and wherein:

Fig. 15 is a plan sectional view taken approximately on line 15—15 of Fig. 1, featuring the apparatus of the multiplex to simplex transmitting portion of the unit; and Fig. 16 is a transverse sectional view taken approximately on line 16—16 of Fig. 1, featuring the signal storage and transfer mechanism between the multiplex storage magnets and the simplex retransmitting contact assembly.

Figure 1:
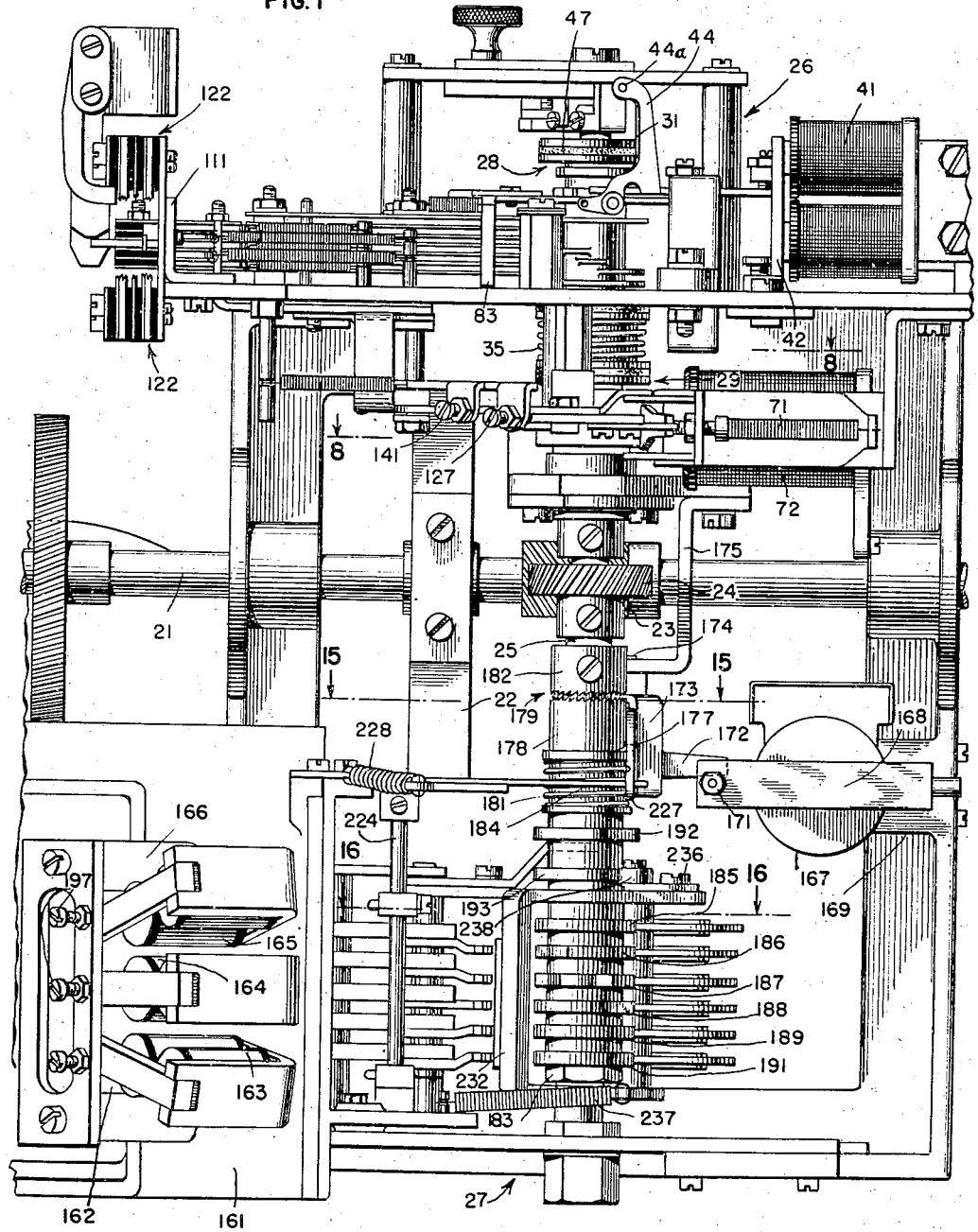
Fig. 1 is a front elevation of a two direction translating unit for communication between a multiplex trunk line and a simplex extension loop circuit, having embodied therein certain features of the present invention.
Figure 2:
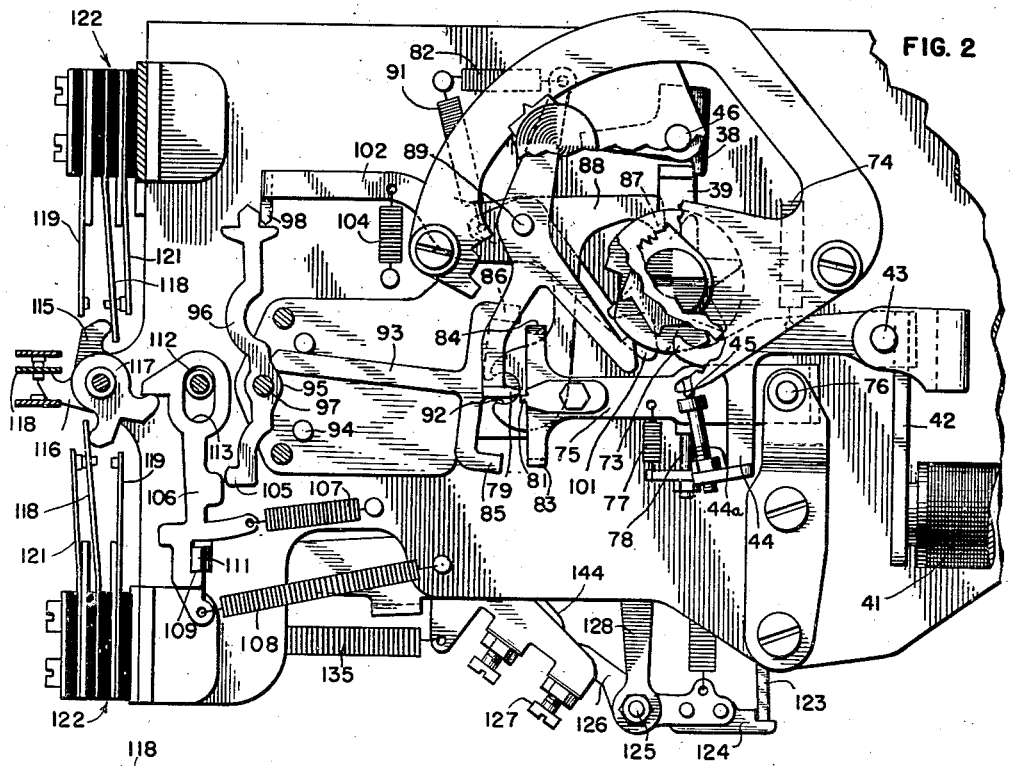
Fig. 2 is a plan view of the apparatus featured in Fig. 1, illustrating in detail the start-stop to multiplex translating unit of the apparatus.
Figure 7:
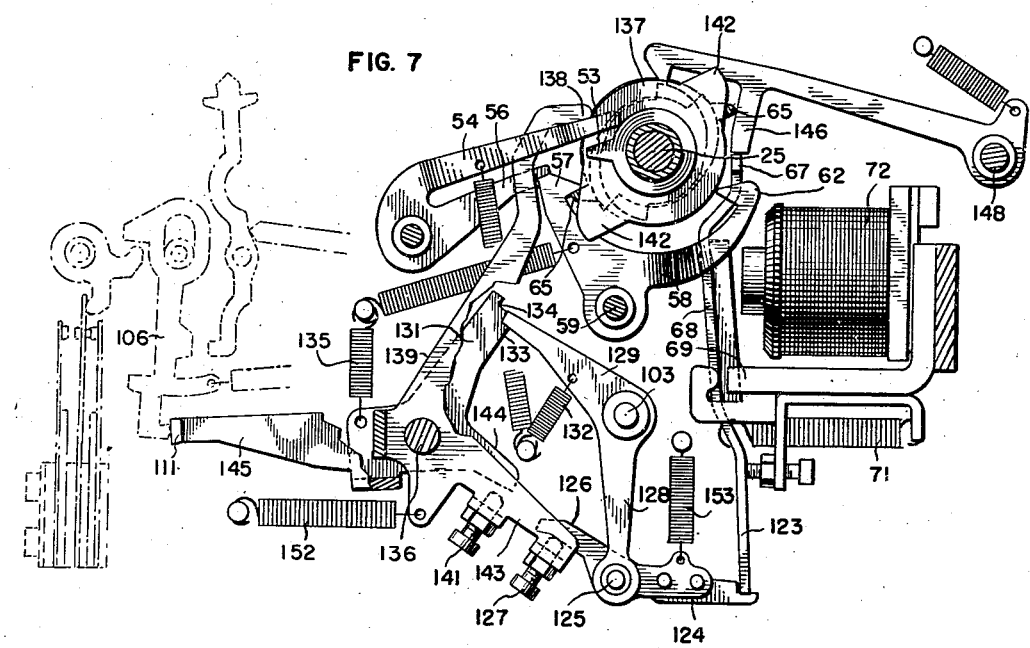
Fig. 7 is a fragmentary plan view of the apparatus featured in Fig. 2 illustrating several of the operating levers in changed positions and featuring an intermediate condition of operation.
Figure 10:
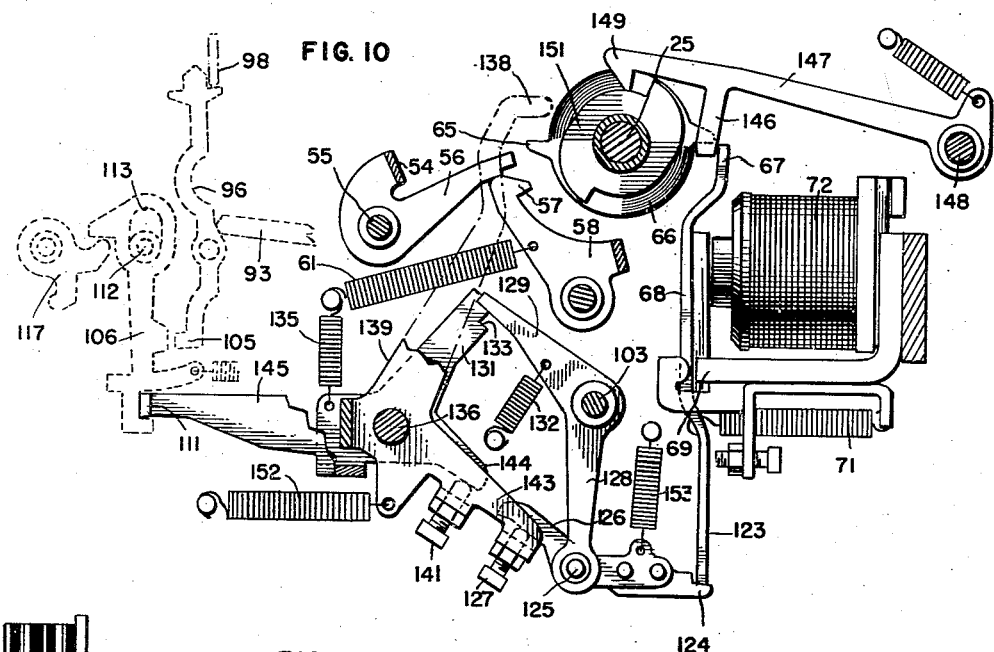
Fig. 10 is a plan sectional view of the apparatus featured in Fig. 7, illustrating a different position of operation.

Power for operating the two principal translating mechanisms is obtained from a horizontal distributing shaft 21, Fig. 1, which may be suitably journaled in a supporting structure 22, driving through a gear 23, the worm wheel 24 which is integrally associated with the vertical drive shaft 25, thus imparting to the latter member clockwise rotation, as viewed in Figs. 2, 7, 10, etc. Shaft 25 extends in a vertical direction through the two mechanisms designated generally 26 and 27, the former of which translates simplex or start-stop permutation code signals into multiplex permutation code signals, while the latter of the two in a reverse process to the mechanism 26 transmits multiplex signals into start-stop permutation code signals.

Except for the fact that the two mechanisms 26 and 27 derive their operating power from a common shaft 25, and that they may be functionally associated with the same channel of signal transmission thereby enabling more conveniently communication in both directions, the performances of the two units are otherwise separate and distinct one from the other. During the course of the following detailed explanation, the simplex to multiplex translating unit 26 will first be described, followed by a detailed description of an exemplary operation, and thereafter there will be described a corresponding explanation of the construction and operation of the multiplex to simplex translating unit 27.

*Simplex to multiplex translation*

The primary drive shaft 25 imparts clockwise rotation to each of two cam assemblies generally designated 28 and 29, more readily discernible in Fig. 12 and to be referred to hereinafter as the primary and secondary cam assemblies or sleeves, respectively. Each of these assemblies is independently frictionally driven through contactual engagement between driving discs 31 and 32 which define the extremities of cam assembly 28, and driving discs 33 and 34 which correspondingly define the extremities of the secondary cam assembly 29.

The outermost driving discs 31 and 34 may be integrally associated with the drive shaft 25 but the innermost discs 32 and 33 are preferably keyed to the shaft so as to be longitudinally movable thereon under the influence of the compression spring 35 which is disposed within a space that intervenes discs 32 and 33 whereat there is located a tongue and groove connection 36 between an anchored collar 37 and the disc 32 and a corresponding connection (not shown) between the collar 37 and the other one of the driving discs 33. Accordingly, each one of the assemblies 28 and 29 is independently movable through a friction drive clutch under impetus of the power shaft 25.

The release to rotation of cam assembly 28 is under the control of an angularly adjustable stop gate mechanism having a stop gate lever 38, Fig. 2, normally disposed to block the path of the rotary arm 39 (clockwise) integral with the cam assembly 28. During the de-energized condition of line magnet 41, its armature 42 is relaxed permitting its rotation clockwise about pivot 43, under which condition its extension 44 acting through screw 44a upon a release pin 45 trips a release trigger (not shown) enabling the stop gate lever 38 spring held under light tension to be overcome by the rotating arm 39 and be rocked in a counterclockwise sense about its pivot 46 permitting the cam assembly 28 to initiate a cycle of rotation. During the energized or normally prevailing line condition of magnet 41 its armature 42 is held attracted and the release pin 45 is not engaged. Under such normal condition the stop gate 38 remains in its position as illustrated in Fig. 2 and the rotation of arm 39 is impeded as illustrated in Fig. 2, preventing the revolution of cam assembly 28 and causing the driving discs 31 and 32 to slip rather than rotate with the felt driving washers 47 and 48.

Cam assembly 28 generally resembles in appearance and operation a typical start-stop distributor cam drum such as is used in printing telegraph apparatus. This includes an armature assisting cam 49, a latch bail operating cam 51, five sword and T-lever actuating cams 52—a to 52—e, and a secondary cam drum tripping projection 53.

All of the elements of this cam assembly except projection 53 are standard equipment in connection with printing telegraph apparatus, and so far as projection 53 is concerned, its location in the spiral distribution of cam projections 52—a to 52—e is as though it were a sixth cam in the spiral series. The effectiveness of projection 53 is determined by the instant when it engages the extremity of an arm 54, Fig. 12, pivoted on a shaft 55 and constituting an integral element of a bell crank whose other arm 56 (see also Fig. 14) latches the extremity 57 of one arm of a pallet lever generally designated 58, pivoted on sleeve 59 and urged by the coil spring 61 in a counterclockwise direction (Fig. 14) so as to normally seek to withdraw from blocking one or the other of the projections 65 of stop disc 66. A lug 62 on the opposite arm of pallet lever 58 lies in the same horizontal plane with cam 64 and is actuatable by its cam lugs 63.

It is to be noted that the extremity 57 of one arm of bell crank 58 lies in a plane relatively lower from that in which extremity 62 of the other arm of said bell crank lies. Discs 64 and 66 are provided with double cam and stop projections respectively in order to facilitate the attainment of a half revolution cycle for the operation of those functions which are controlled by cam drum 29. When the cam 53 of the uppermost cam assembly 28 engages the follower extremity of arm 54 and causes its other arm 56 to be withdrawn from behind the extended pallet lug 57, spring 61 is then free to rock the bell crank 58 in a counterclockwise direction, Fig. 14, permitting the projection 65 to pass beyond the position thereat illustrated and the entire cam assembly 29 then rotates until it achieves a secondary stop position when that lug 65, which is 180° opposite the one just released upon the withdrawal of pallet lug 57, encounters the awaiting extremity 67, Fig. 7, of an armature lever 68 pivotally confined at 69 and urged in a counterclockwise direction by the coil spring 71. The secondary cam assembly 29, of which disc 64 is an integral part, is accordingly thereat held until the local control positive release magnet 72 becomes energized due to the sending by the local multiplex distributor of a special start impulse, after a manner well known in multiplex telegraphy.

Figure 8:
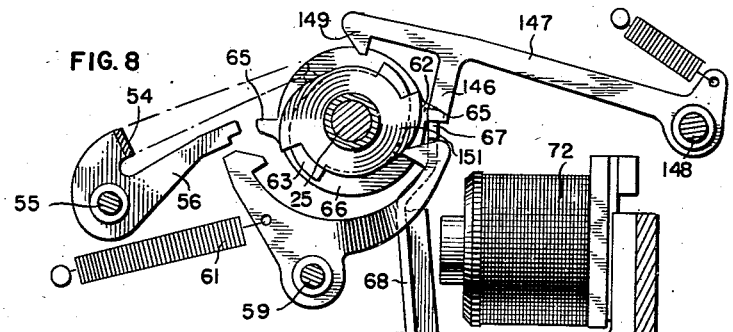
Fig. 8 is a fragmentary detail sectional view taken approximately on line 8—8 of Fig. 1.
Figure 9:
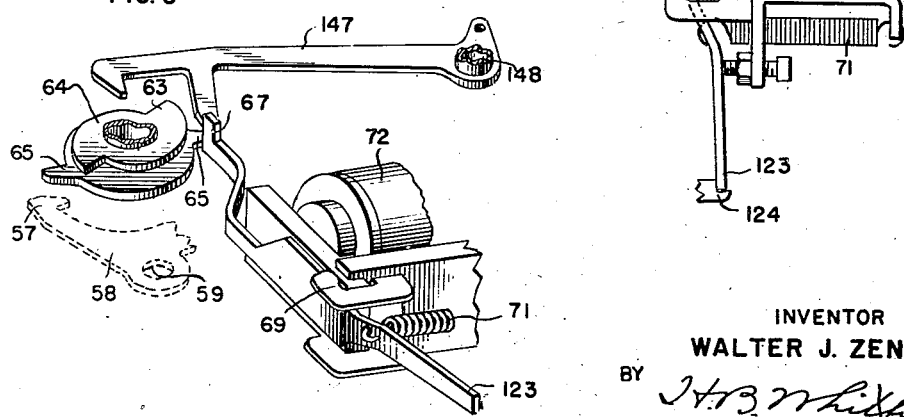
Fig. 9 is a detail perspective view featuring the multiplex impulse release magnet apparatus which is associated with the cam sleeve of the simplex to multiplex translating portion of the unit.
Figure 14:
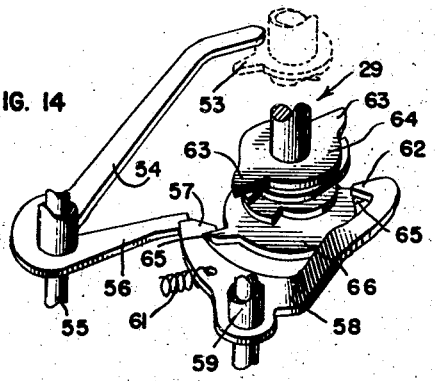
Fig. 14 is a detail perspective view of the secondary cam sleeve assembly and trip mechanism of the simplex to multiplex translating unit.

As a result of the energization of magnet 72, its armature 68 is attracted, withdrawing the blocking extremity 67 from the path of the then engaging lug 65 whereupon the secondary cam assembly 29 resumes its clockwise rotation causing an oncoming involute apex 63, Figs. 8 and 14, to engage the follower projection 62 and rock the bell crank 58 in a clockwise direction about its pivot 59 and against the tension of spring 61. This reinstates the stop tooth 57 into the path of an oncoming projection 65 of disc 66 which projection had previously been blocked by the armature shoulder 67 and the sleeve assembly 29 is then arrested after having completed a cycle of rotation of 180°.

It will accordingly be recognized, therefore, that the primary cam sleeve assembly 28 is released for a cycle of rotation under the control of the start impulse which releases the incoming line magnet 41, and that it in turn initiates a first release supervision of the secondary cam assembly 29 whose second and final release supervision is controlled by the multiplex distributor impulse magnet 72. There will now be described a succession of operations which result from the supervision of the two afore-described cam assemblies 28 and 29 as a result of which a start-stop permutation code signal is advanced through the apparatus and relayed over a multiplex distributor.

From Fig. 2 it is evident that armature 42 is provided with a projection 73 which, urged by spring 74, follows the periphery of star cam 49 to reinstate the energized condition of armature 42 in anticipation of each signal component element. This practice, now well known, relieves the line magnet 41 from having to pull the armature its full distance of movement and as a consequence at each impulse interval the armature may either remain in its energized position upon receiving a marking impulse or it may release the armature and permit the latter member, in response to its spring 74, to return to its unenergized position.

A secondary lever 75 pivoted at 76 is constrained to follow the action of the armature 42 due to the influence of the connecting spring 77 which urges said lever 75 in a counterclockwise direction until its side abuts the limit screw 78. Lever 75 is free to respond to the urge of its spring 77 and move in a counterclockwise direction about pivot 76 but is moved in a clockwise direction under the influence of armature spring 74 acting through the limit screw 78 at a certain precise interval during each signal component when the lock bail 79 is withdrawn from the path of its latching projection 81. During the remainder of the time said bail 79 is permitted to assume a position on one side or the other of said projection 81, depending upon the chance position of secondary lever 75. Lock bail 79 is influenced by its spring 82, and thereby the secondary lever 75 is latched against movement and is accordingly held so that one or the other of its downwardly extending bars 83 or 84 lies in the path of a sword lever hilt 85 or 86.

During each intervallic period which corresponds to the afore-mentioned signal impulse component, one of the afore-described cam projections 52—a to 52—e is tuned to engage an associated individual follower tip 87, Fig. 2, of a claw lever 88, five of which are pivoted at 89 under clockwise tension of their springs 91.

The actuation of one of said claw levers 88 by its particular cam projection 52—a to 52—e results in its counterclockwise movement about pivot 89, and as a consequence of its disc and socket articulation 92 with a particular one of five swords 93, Fig. 2, the latter element is thrust rightwardly causing its hilt 85 to engage the downwardly extending bar 83 or its hilt 86 to engage the downwardly extending bar 84 of the afore-described secondary lever 75, depending upon the instantaneous disposition of said secondary lever 75.

Accordingly, the instantaneous position of lever 75 and as a result the disposition of its downwardly extending bars 83 and 84, will determine the placement of swords 93 and the consequent movement of the swords rightwardly as viewed in Fig. 2 will in turn cause said members to be rocked clockwise or counterclockwise about their disc and socket articulations 92 with said claw levers 88, resulting in their disposition as indicated in Fig. 2, or in an opposite condition with their sword engaging the counterclockwise extreme, stop pin 94. The clockwise tension imparted to each one of the claw levers 88 by its individual spring 91 will thereafter be communicated to the swords 93 causing their extremity to press on one side or the other of the median hump 95 of an associated intermediate storage lever 96, which is one of a set of five of such levers, all pivoted on a common pivot rod 97.

Figure 11:
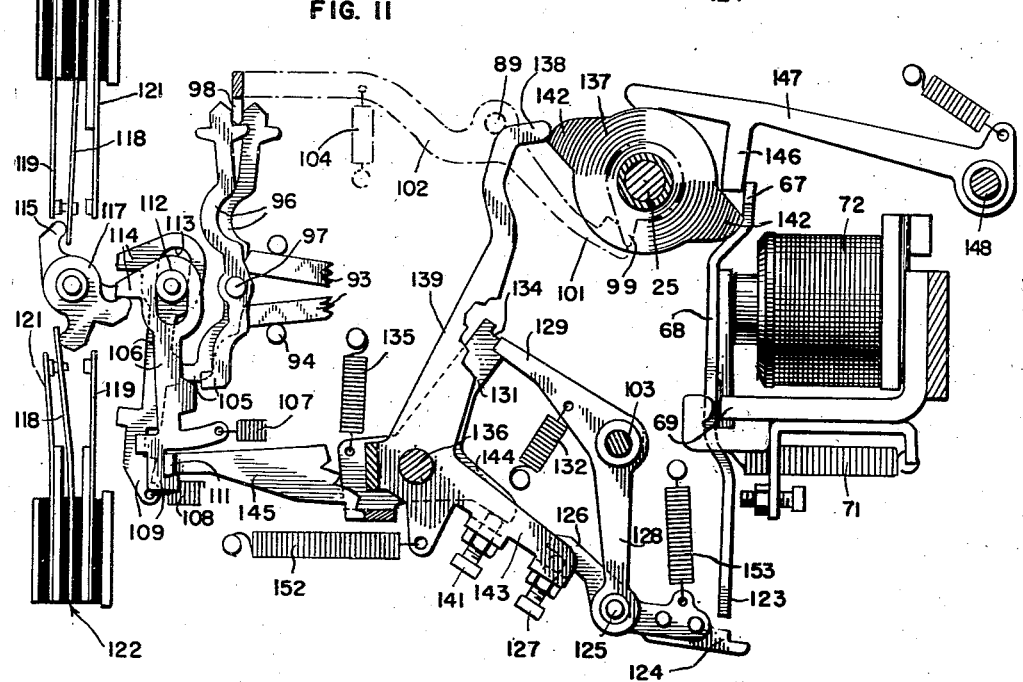
Fig. 11 is a plan sectional view featuring the apparatus illustrated in Figs. 7 and 10 in a still different condition of operation.
Figure 12:
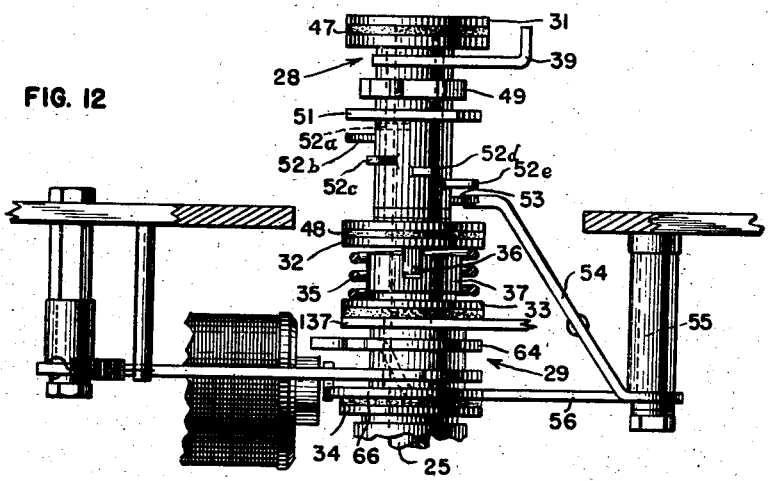
Fig. 12 is a fragmentary vertical sectional view with parts broken away featuring the construction of the cam assembly and clutch apparatus of the simplex to multiplex transmitting unit.
Figure 13:
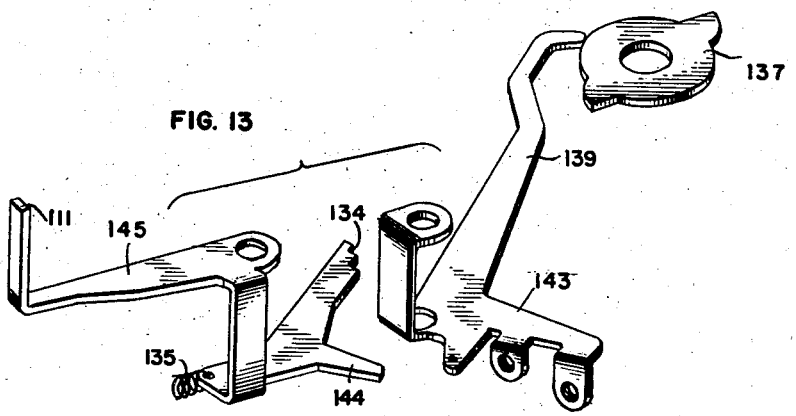
Fig. 13 is a detail perspective view illustrating the relative position of several of the control levers of the apparatus pertaining to the simplex to multiplex transmitting mechanism.

The several intermediate storage levers 96 are not immediately free to respond to the prodding of their individual swords 93 but must await the withdrawal of a latch bail 98 which during the major portion of each signal interval is disposed as illustrated in Fig. 2, but during the final portion of a cycle of revolution of cam assembly 28, a special cam projection 99, Figs. 11 and 12, lying just beneath the latch bail cam 51, engages the follower extremity 101 of a lever 102 pivoted at 89 and integral with said bail 98. Accordingly, at this instant in the signal cycle bail 98 is withdrawn against the tension of its restoration spring 104 and the several intermediate storage levers 96 are rocked clockwise or counterclockwise according to the placement of their respective swords or prods 93, as best indicated in Fig. 11.

Thus far there has been traced the storage of a signal comprised of five intervallic components from the original storage manifestation upon the five claw levers 88 which is but momentary, through a secondary storage condition of the swords 93 and currently to the intermediate storage levers 96. When the bail 98 resumes its latching position as shown in Figs. 2 and 11, the swords or prods 93 may thereafter be realigned for the registration of a succeeding signal, the previous signal being meanwhile latched in the storage condition of the several levers 96.

The lowermost extremities of the several storage levers 96 are shaped with significant leftwardly extending projections 105, disposable according to one or the other of the two positions featured by exemplary levers 96 in Fig. 11. For convenient reference these positions as well as the condition of other signal responsive components will be referred to hereinafter as marking and spacing, relative to the type of signal impulse which originally effected their disposition. The effect of projections 105 is transmitted to a corresponding series of five spring loaded transfer levers 106, two of which are discernible in marking and spacing position in Fig. 11 to correspond with the disposition of their related intermediate storage levers 96. Each one of the signal transfer levers 106 is urged by a spring 107 or 108 to engage the projections 105 and to accordingly dispose or withdraw their operating shoulders 109, see also Fig. 2, from the path of a common operating bail 111.

The transfer levers 106 are pivotally supported upon a roller sleeve 112 which extends through elongated openings in said levers, but in their normal condition, as indicated in Fig. 10, the several levers are urged by the spring effect of a flexible contactor blade communicated through individual motion transfer discs 115, 116, or 117, to be described later, so that the sleeve 112 resides at the lowermost limit of the elongated openings 113.

Figure 4:
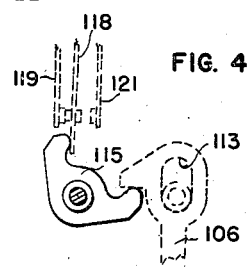
Fig. 4 is a fragmentary detail view, outlining the contour of one type of storage contact transfer lever.
Figure 5:
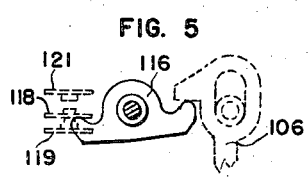
Fig. 5 is a fragmentary detail view of another type of storage contact transfer lever.
Figure 6:
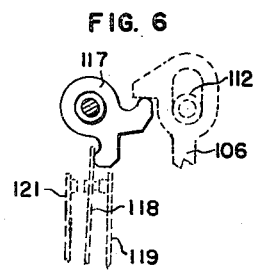
Fig. 6 is a fragmentary detail view of a third type of storage contact transfer lever.

As a consequence of the secondary control supervised by the cam assembly 29, described above, bail 111 is thrust downwardly and carries with it those of the transfer levers 106 which are permitted to assume a relative counterclockwise extreme position, Fig. 11, and in so doing their uppermost overhanging lugs 114 are caused to engage and rock clockwise their associated contact operating bell crank discs 115, 116, or 117, Figs. 4, 5, and 6, depending upon the particular type of such discs and the relative disposition of its associated contactor 118.

Figure 3:
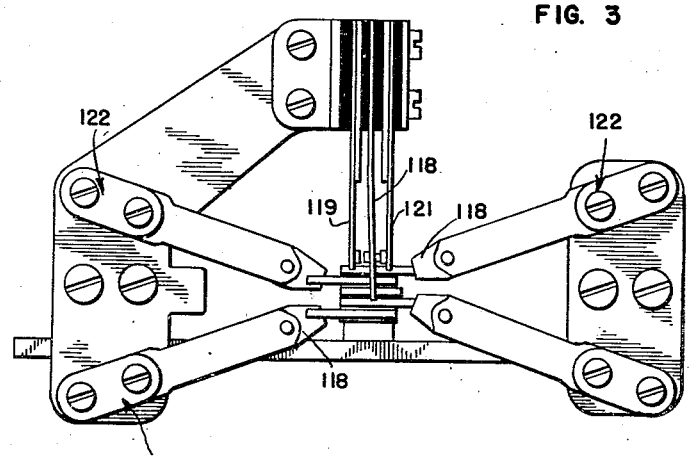
Fig. 3 is a fragmentary end elevation of the multiplex storage contacts associated with the apparatus featured in Fig. 2.

Each contactor 118 is a flexible element which may be moved between two opposite contact members 119 and 121 of a set of which there are five, Fig. 3, one set relating to each signal component of a five unit multiplex code signal. The contactors 118 are electrically connected to the segments of an outgoing multiplex distributor, and depending upon whether any contactor 118 is flexed to engage its contact 119 or 121, the outgoing multiplex distributor segment associated therewith will accordingly be conditioned plus or minus, otherwise classifiable as marking or spacing. Normally, the flexure of the contactors 118 will maintain them in engagement with the marking contact blades 119, but upon actuation of the storage transfer lever 106 associated therewith, contactor 118 will be forced into engagement with the spacing contact blade 121 accordingly introducing spacing current over the associated segment.

Thus, there has been described in a general sense the progress of a storage signal condition beginning with its introduction into the primary storage levers 88 through the intermediate storage lever 96 and thereafter the transfer of the signal to the several sets of contact assemblies 122, Fig. 3. In order to correlate the performance of the above-described signal translating mechanism with the conventional behavior of start-stop and multiplex telegraph systems, it is necessary to provide apparatus for advancing the aforedescribed storage signal condition in accordance with a control which will enable the average rate of signal transmission in an extension arm circuit as herein contemplated to correspond with the slowest rate of conventional signal communication as between start-stop simplex on the one hand and multi-channel multiplex systems on the other.

Conventionally, multiplex signal transmission is performed at an appreciably higher rate of signal communication than that of simplex transmission; accordingly, it is necessary to so regulate the progress of telegraph signals in accordance with the capacity of the multiplex transmittter or transmitting distributor and to accordingly enable the operation of simplex signal transmission at peak apparatus efficiency. The principal supervision of storage signal advancement is regulated by the secondary cam assembly 29 described above whose initial release is effected by the cam projection 53, Figs. 12 and 14. This initial release operation is indicative of the receiving distributor cam assembly 28 having transferred a signal through the primary claw levers 88 to the intermediate storage levers 96. The progress of the signal beyond this position must then await another impulse received by the release magnet 72 whose winding is electrically connected to a special segment in the transmitting multiplex distributor. During the idle condition of the simplex to multiplex translating apparatus, cam assembly 28 is disposed in the position illustrated in Figs. 2 and 7, armature 68 of secondary control magnet 72 is relaxed with its extremity 67 lying in the path of but having not yet encountered a projection 65, next oncoming, of disc 66. After one simplex signal has been received and the cam assembly 28 has been released to rotate throughout one revolution, its release cam projection 53 encounters the follower arm 54 of the tripper bell crank and as a result, the secondary control cam assembly 29 is freed and advances to the position indicated in Fig. 8 whereat projection 65 is obstructed by the shouldered extremity 67 of armature 68 awaiting the energization of magnet 72. The impulse from the multiplex distributor for accomplishing this is a signal indication that the distributor is in proper phase position for the relaying to it of the five component signal impulses. As a result of the attraction of armature 68 in response to this impulse, cam sleeve assembly 29 is permitted to rotate further.

An opposite extremity 123 of armature 68 is at all times resting in a notched arm 124 pivoted at 125 of a lever whose other arm 126 is presented against the limit screw 127 as indicated in Fig. 10. As a result of the movement of armature extremity 123 upon the energization of magnet 72, lever 124—126 is shifted bodily leftward, Figs. 2, 7, 10, and 11, displacing and at the same time rotating about its pivot 125, and since the latter is carried by one arm 128 of a lever whose other arm 129 comprises a shoulder latch for the transfer bail assembly and particularly arm 131 thereof, restoration spring 132 is distended as lever 128—129 rotates clockwise and its shouldered extremity is withdrawn from the first notch in arm 131 as illustrated in Fig. 7, permitting spring 135 to rock the transfer bail assembly in a clockwise direction about pivot 136 and presenting the second notch 134 into engagement with the extremity of lever arm 129.

The foregoing described displacement of parts is illustrated in Fig. 10 where it will be noted that the transfer bail 111 is disposed in its uppermost position in readiness to receive any one or ones of the transfer levers 106 which may be displaced counterclockwise as a result of a marking impulse. This apparatus will remain in the designated position, Fig. 10, until it is restored by the operation of the double apex cam 137, Figs. 7, 11, 12, and 13, acting upon the extremity 138 of a follower arm 139 that comprises part of a lever pivoted at 136 and having another arm which supports the adjustable limit screws 127 and 141.

As a result of the attraction of armature 68, shoulder extremity 67 is withdrawn from projection 65 with which it had been in abutting engagement and the secondary cam assembly 29 is thereby freed to rotate clockwise until an opposite lug 65 of the same cam disc 66 encounters the latching projection 57 of bell crank 58. Thereafter, one of the apices 142 of the cam 137 will encounter the follower 138 and will rock lever 139—143 counterclockwise about its pivot 136 so that limit screw 141, engaging a projecting arm 144 which is integral with the afore-described arm 131 as well as with the transfer bail carrying arm 145, rocks that assembly counterclockwise about pivot 136 and moves the bail blade 111 downwardly into the position illustrated in Fig. 11.

This carries those of the transfer levers 106 which responded to a marking impulse downwardly, rocking the contact operating disc 115, 116, or 117 in a clockwise direction and causing their associated contactors 118 to engage their marking contact points 121.

As a further result of the magnetic attraction of armature 68, its tail end 123 thrusts lever 124—126 leftwardly displacing the pivot 125 and thereby rocking latch 128—129 clockwise about pivot 103 as it overcomes restoration spring 132. This permits the three-armed lever 131—144—145 to respond to spring 135, since latch shoulder of arm 129 is withdrawn from notch 133 and has presented to it instead notch 134.

Thereafter the secondary cam assembly 29 continues to rotate clockwise beyond the position in which it is illustrated in Fig. 11 and the particular apex 142 of cam 137 rides off the follower 138 permitting the restoration spring 152 to move bell crank lever 139—143 back in a clockwise direction about pivot 136. As a result of the clockwise movement of lever 139—143 limit screw 127 is withdrawn from lever 124—126 which lever may thereupon respond to the influence of its spring 153 and be moved in a counterclockwise direction about pivot 125 until it is blocked upon encounter with the end 123 of armature 68. But, the latch lever 128—129 may not be tripped until armature 68 is first relaxed then again attracted. Armature 68 may not be relaxed so long as lug 146 of a trip lever 147 prevails in the blocking position shown in Figs. 10 and 11, and such condition of blocking obtains until one of the apices of cam 151 lifts said lever 147 back to its Fig. 6 position. Accordingly then, should the multiplex distributor chance to send its sixth or special impulse to magnet 72 during the interval of time which follows the preceding No. 5 signal impulse and before the secondary cam assembly 29 may achieve its stop condition, Fig. 7, no effect will be had because armature 68 remains dormant in its energized condition as shown in Figs. 10 and 11 and the signal stored in lever 106 will therefore remain and will be transmitted during the succeeding revolution of the multiplex distributor. Meanwhile, cam 151 will lift lever 147 and armature 68 will fall back and recede its end 123 behind the shoulder of lever arm 124. Thereafter the magnet 72 is re-energized pursuant to a succeeding multiplex distributor pulse received upon readiness of the distributor apparatus to transmit a succeeding code signal. Upon each de-energization of the magnet 72 armature 68 thus falls back a limited distance only whereat its upper extremity including shoulder 67 rests against a downwardly extending lug 146 of a spring loaded trip lever 147, pivoted at 148 and having an extreme follower projection 149, see Fig. 10, which rides the periphery of the trip cam 151. The apexes of trip cam 151, of which there are two just as in the case of the other cams of the secondary control cam assembly 29, become effective to raise the trip lever 147 so that its projection 146 clears the extremity of armature 68 only after the secondary cam assembly 29 has consummated a certain angle of rotation so as to assure the contemporary signal a sufficient period of time in the setting of the final storage levers 106. As a consequence of the lifting of trip lever 147 by cam 151 the armature 68 is permitted to resume its original position as shown in Fig. 7, but an oncoming projection 65 will not at this time engage the end 67 of armature 68 because the sleeve will be arrested through the engagement of lug 65 with the projection 57 of bell crank lever 58.

Since the multiplex transmitting distributor rotates continuously and is driven at a rate of speed slightly greater than the maximum speed of the simplex transmitter a condition may obtain in which the phasing impulse transmitted to magnet 72 by the multiplex retransmission distributor arrives in advance of the time when cam 151 of the cam assembly 29 raises the latch lever 147. The consequent energization of magnet 72 will, under such circumstances, be idle since armature 68 is already disposed in the attracted position with the result that the multiplex transmitting distributor will undergo an idle revolution transmitting an all-spacing signal. The contacts 122 will in such case be found in their spacing positions due to the fact that since the previous phasing impulse signal which pulled up armature 68 and tripped latch 128—129 to free the bail lever 131—144—145, the auxiliary cam assembly 29 has not as yet been released or if released has not had sufficient time in which to engage follower 138 with the apex 142 of its cam 137.

As soon as one of the apexes 142 of cam 137 has rocked lever 139—143 counterclockwise sufficiently for limit screw 141 to engage arm 144 further movement thereof carries three-armed lever 131—144—145 along with it and as a result notch 134 is withdrawn and notch 133 replaces it for presentation to the shouldered extremity of lever arm 129. The latter thereupon snaps into place as biased by spring 132 and so retains lever 131—144—145 in counterclockwise extreme position. Meanwhile, limit screw 127, which has been engaging arm 126, therefore causes lever 124—126 to assume an extreme clockwise position as shown in Fig. 11, opposing spring 153 but accomplishing the maneuver of by-passing the extremity of armature tail 123. When cam apex 142 passes follower 138 and the lever 139—143 resumes its spring urged position, limit screws 141 and 127 withdraw from their respective lever arms 144 and 126, and as a result of the latter, arm 124 swing into end abutment with armature tail 123. This condition prevails for a brief instant only for when an apex of cam 151 lifts lever 147 to retract armature blocking projection 146, the armature 68 responds to its spring 71 and the relationship of Fig. 7 is restored.

From the two illustrations of the normal position, Figs. 2 and 7, it will be observed that bail 111 is normally down so as to hold several tertiary transfer levers 106 in their actuated position. Accordingly, the apparatus is designed to maintain a signal storage condition latched in the several contact pairs 122 featured in Fig. 3, in their effective position during the maximum portion of each cycle, changing over to a new condition during a brief interval of time which corresponds with the upward and downward movement of bail blade 111 as actuated by cam apex 142.

When a signal has been advanced to the ultimate storage position manifest by a setting of the tertiary transfer elements 106, the simplex receiving selector mechanism controlled by the receiving magnet 41 is free to respond to a succeeding start-stop permutation code signal which may then be advanced through the afore-described storage overlap step including claw levers 88 and prod swords 93 to the intermediate storage levers 96. Meanwhile, when the signal phase condition is achieved by the transmitting multiplex distributor, an impulse is transmitted to the secondary cam assembly release magnet 72 whereupon the latter member effects a tripping of the secondary control sleeve 29, Fig. 14.

Since, as has been explained, multiplex transmission is preferably operated at a rate of speed slightly in excess of that which characterizes simplex systems, a condition obtains under which the multiplex transmitting distributor is likely to transmit its release impulse to magnet 72 during occasions at a time before a related permutation code signal has been advanced to the tertiary storage levers 106. Under such circumstances, the phasing impulse upon release magnet 72 will be idle since the extremity 67 of armature 68 will at this time not yet have been encountered by the cam lug 65. Also, the opposite extremity 123 of armature 68 in shifting pivot point 125 leftwardly and rocking bell crank lever 128—129 clockwise about its pivot 103 causes bail 111 to be instantly moved to its uppermost position under the influence of spring 135 as the shouldered extremity of arm 129 changes from notch 133 to notch 134. Bail 111 is not restored to its down position, however, because the cam assembly 29 which carries cam 137 for achieving this purpose is still retained in its arrested position. Consequently, upon the arrival of the multiplex transmitting distributor brush in transmitting relationship with the particular channel, no marking signals will be transmitted because none of the tertiary storage levers 106 will at this time be held in a down position 111, a condition necessary in order to displace any one of the contactors 118 from its normal or spacing condition to its opposite or marking condition.

As a further consequence of the energization of magnet 72 during the afore-described infrequent intervals due to the excessive speed of the multiplex system, latch projection 146 will be ineffective to prolong the holding of said armature 68 in its energized condition due to the fact that the cam follower projection 149, Fig. 10, will at this time be found in the position illustrated in Fig. 7, namely, resting on the apex of its cam involute with the blocking projection 146 withdrawn clear of the armature extremity 67. Consequently, the effect of the multiplex transmitting distributor having surpassed its phase relationship with the simplex translating apparatus will be merely to undergo idle cycles of rotation without affecting the normal operation of the translating unit.

Upon a succeeding rotation the signals stored by the transmitting unit will have been advanced beyond the intermediate storage condition provided that start-stop permutation code signals are being continuously received by the line magnet 41, and thereafter upon receiving the impulse by magnet 72, armature 68 will be effective to produce the release of secondary cam assembly 29 to obtain the effective operation of the contact operating bail 111.

*Multiplex to simplex translation*

The multiplex to simplex translating unit is illustrated in Figs. 1, 15, and 16. A set of five electromagnets suitably mounted on a supporting plate 161 and individually designated 162 to 166 is electrically associated with the five segments of a receiving multiplex distributor channel. The phasing segment relating to the particular channel is electrically associated with a special release magnet 167 whose armature 168 pivoted at 169, carries an adjustment screw 171 with which it engages a sidewardly extending arm 172 of a clutch trip lever 173.

The latter member is pivoted at 174 on a vertical pivot screw which is supported from a bracket 175 rigid with the frame structure. Upon the energization of the phasing impulse magnet 167 the movement of its armature 168 rocks the clutch trip lever 173 in a counterclockwise direction, Fig. 15, about its pivot 174, withdrawing a downwardly extending lug 176 from the path of a sidewardly extending sleeve cam projection 177, Fig. 1, of the driven element 178 of the clutch coupling generally designated 179.

This releases the driven member 178 permitting it to submit to the influence of an expansive coil spring 181 and accordingly be moved upwardly so as to dispose its teeth into engagement with the corresponding radial clutch teeth of the driving portion 182 of clutch 179. Thereby, clockwise movement, Figs. 15 and 16, is communicated to the cam assembly 183 which is a sleeve having tongue and groove engagement as at 184 with the driven member 178 of clutch 179 and which is provided with a series of six transmitting cams designated 185, 186, 187, 188, 189, and 191. In addition to these cams, the sleeve 183 also carries two special function performing cams 192 and 193.

The five line magnets 161 to 166 are electrically conected respectively to the segments of a multiplex receiving distributor channel. Each magnet 161, etc., is provided with an armature 194 pivoted at 195 in the magnet supporting bracket 196 and carries an adjustable actuating screw 197 disposed in substantially axial alignment with a trip plunger 198 individual thereto.

The several trip plungers 198 are loaded with compression springs 199 all carried in a supporting block 201, as shown in Fig. 16. The extending ends of the several plungers 198 are reduced in diameter as at 202 and their extremities abut associated arms 203 of latch levers 204 pivoted upon a common shaft 205 and each provided with a latching shoulder as at 206 whereat it receives and holds a spring loaded trip bell crank 207. The several bell cranks 207 are all pivoted on a shaft 208 and each is provided with a spring 209 urging it in a clockwise direction about shaft 208. The shouldered extremity 211 on each bell crank 207 is adapted to engage the shoulder 206 of its related latch lever 204 and under tension of the springs 209 said levers are so held pending the clockwise rotation of the release triggers or levers 204 when the associated magnet 161, etc., attracts its armature 194 and causes its associated plunger 198 thereby to overcome the latch spring 212.

With each bell crank 207 is individually associated a contiguous lever 213 also pivoted on shaft 208. During the latched condition of its bell crank, the extremity 214 of each bell crank is disposed so that a substantial space intervenes between it and a common bail 215, with which there is integrally associated an arm 217 carrying the follower roller 218. Roller 218 is urged by the spring 219 to follow the periphery of the afore-described cam 192, Fig. 1, whose dwell nadir portion extends throughout about 250° of its periphery and whose apex 221, Fig. 15, may rock arm 217 so as to cause the common bail 215 to engage all of the extremities 214 of those bell cranks 207 that were released by actuation of their latches 204 under impetus of signal impulses as already explained.

In this way, the bell cranks 207 are restored to the position in which they are illustrated in Figs. 15 and 16. However, upon being released from this position due to the afore-described actuation by one of the storage magnets 162, etc., latch lever 204 is rocked clockwise permitting the associated bell crank 207 to respond to its spring 209 and move to a position of release which is limited by the common return bail 215. In so doing the first one of the bell cranks 207 thus released will engage a transverse bail 222 which is integrally associated with the yoke 223 pivoted on shaft 224. The yoke member 223 carries a sidewardly extending arm 225 whose hooked extremity 226 normally lies in the path of a downwardly protruding shoulder 227, see also Fig. 1, of the clutch trip arm which extends from the clutch trip member 173.

This arrangement whereby the hook 226 engages the extremity of clutch release lever 173 at 227 under the principal supervision of bail 222 affords a means of preventing the release of clutch 179 and the consequent transmission of start-stop signals as a result of the rotation of cam assembly 183 except in response to a code signal. Clutch 179 will not become effective in response to the all-spacing signal which represents the idle condition in multiplex transmission. The all-space signal is the only one which will fail to actuate the bail 222 and consequently to withdraw the hook 226 from its blocking position. A spring 228 tends to maintain the latch arm 225 in its effective condition during the continual transmission of all-space signals.

The lower arms of lever 213 are provided with underlying hook portions 229 and with knife edge combs 231 which may be latched on one side or the other of an intervening latching bail 232. The upper arms of said levers 213 are bent in sideward offset relationship so as to abut as at 233 arcuate protuberances of the bell crank lever 207 designated 234.

Mild tension springs 235 individual to each one of said levers 213 maintain the afore-said abutting relationship between the offset arms 233 and arcuate protuberances 234. Latching bail 232 extends the full width of the cam assembly as best indicated in Fig. 1, and is pivoted on a shaft 236, seeking to maintain a clockwise extreme position as influenced by its spring 237. A follower roller 238 carried by the framework of bail 232 pursues the periphery of cam 193, afore-described. The contour of cam 193 is that of a continuous dwell in its nadir portion with but a brief apex as denoted at 239, Fig. 15.

Under this circumstance of supervision, bail blade 232 is maintained in its latched position as indicated in Figs. 15 and 16 at all times except during a brief interval of the cycle when the apex 239 passes the follower roller 238 at which time a transfer of the positions of the several contact lever control members 213 as urged by springs 235 or 209 is permitted. In accordance with the disposition of said levers 213 their underhanging extremities 229 are disposed to block or clear the ends 241 of a set of gooseneck contact controlling levers 242. The latter members are pivoted on shaft 236 and each supervises the closure of an individually associated contact pair generally designated 243.

The cam assembly 183 consists of a series of six cams each having a recess with the several peripheral recesses disposed in a spiral alignment about the circumference of the assembly 183. According to this arrangement, each gooseneck lever 242 under the tension of its contact spring and seeking counterclockwise rotation about shaft 236 probes with its follower projection 244 for the individual recess 245 of its associated cam. Upon encountering this recess each during an allotted interval in the cycle only those goosenecks 242 whose associated blocking levers 213 are disposed in clockwise or noninterfering positions will be permitted to follow into these recesses 245 and accordingly to permit the closure of the contact pairs 243 associated therewith.

Others of said gooseneck levers 242 will be prevented from so doing notwithstanding their encountering recesses 245 by reason of the blocking of their associated ends 241 of the lever projections 229. Accordingly, these will be maintained in the position illustrated in Fig. 16 and their contactors 243 will remain ajar.

The rate of speed at which the afore-described apparatus may operate, will depend upon the pacing effected by the multiplex distributor whose incoming impulses are impressed upon the receiving magnets 162 to 166 and upon the frequency of the start impulse impressed upon control magnet 167. After the five impulses are stored in the receiving magnets, a release impulse is transmitted to the special magnet 167 which immediately effects the closure of clutch 179 whereby power is communicated from the prime mover shaft 25 to the cam assembly 183. In the event that no signals are impressed upon the segments of the multiplex distributor which condition is identified with an all-spacing characteristics in each one of the segments, bail 222 will fail to be displaced and accordingly latch hook 226 will not be withdrawn from the clutch release lever extremity 227. Under this circumstance, the receipt of a start impulse by magnet 167 and its energization will have no effect because armature 168 will be unable to rock the trip lever 173.

While the present invention has been explained and described with reference to a specific embodiment, it is to be understood nevertheless, that structural variations and changes in design may be instituted without departing from the essential spirit or scope thereof. Accordingly, it is not intended to be limited by the particulars of the foregoing detailed specification nor by the illustrations in the accompanying drawings except as indicated in the hereunto appended claims.

The invention claimed is:

1. In a start-stop to multiplex signal repeater, a series of sets of code signal storage elements, a clutch coupling for controlling the application of power to establish a signal setting onto a first set of said storage elements under the supervision of start-stop signals, means for effecting a code signal transfer from said first set of storage elements to a succeeding one of said sets, a further clutch coupling, and apparatus under the supervision of a multiplex distributor for enabling said further clutch coupling to effect a code signal transfer from an intermediate set of said series of sets to an ultimate set of said series.

2. In a start-stop to multiplex signal transmitting system, a set of multiplex contact pairs corresponding in number to the components of a code system, a set of storage members for impressing a code combination signal on said contact pairs, a set of conditioners for supervising the operation of said storage members, a start-stop distributing apparatus comprising a rotatable shaft, a distribution of cams carried by said shaft, and an electromagnet included with a supervised settting device for communicating under the control of said cams a setting to said conditioners in accordance with the marking or spacing attributes of code combination line signals impressed upon said electromagnet.

3. In a start-stop signal to multiplex signal translating system, a set of multiplex distributor contacts, a set of mechanical storage members for impressing a code combination signal on said contacts, a set of storage member conditioners, a start-stop receiver distributing apparatus comprising a rotatable shaft, a series of cams carried by said shaft one for each signal component of a code, and an electromagnetically supervised setting apparatus for communicating a setting to said storage member conditioners in accordance with alternative electrical characteristics of line signals impressed upon said electromagnetically supervised apparatus under the control of said cams.

4. In a start-stop to multiplex translating system, a set of multiplex distributor conditioning contacts, a set of storage members one for each of said contacts, a set of cams for distributing the impulses of a start-stop code system, impulse for impulse in accordance with the marking or spacing condition of the impulses of each code to said storage members, a cam assembly including transfer means for positioning said contacts in accordance with said storage members, a clutch for said set of cams, a clutch for said cam assembly, and means for releasing said cam assembly under the joint control of said set of cams and a multiplex retransmission distributor.

5. In a start-stop to multiplex translating system, a set of multiplex retransmitting distributor contacts, a set of impulse condition storing devices related one for one with said contacts, a primary cam assembly for distributing received impulses of start-stop permutation code signals to said storage devices, a secondary cam assembly including means for simultaneously positioning said contacts in accordance with said storage devices, a clutch for said primary cam assembly, a clutch for said secondary cam assembly, and means for releasing said secondary cam assembly under the joint control of said primary cam assembly and the multiplex retransmission distributor.

6. In a multiplex translating apparatus, a common power shaft, a start-stop signal distributor cam assembly associated with said shaft, a multiplex signal transfer cam assembly associated with said shaft, friction clutch means for each of said cam assemblies, means under the control of said start-stop cam assembly for initiating the release of said multiplex cam assembly, and a multiplex retransmitting distributor for consummating said cam assembly release.

7. In a multiplex translating apparatus, a common power shaft, a start-stop signal cam assembly selectively rotatable by said shaft, a transfer cam assembly selectively rotatable by said shaft, friction clutch means associated with each of said cam assemblies to effect rotation thereof by said shaft, means under the control of said start-stop cam assembly for partially releasing said transfer cam assembly, and a multiplex distributing apparatus for consummating said transfer cam assembly release.

8. In a start-stop to multiplex translating system, a series of primary storage devices, a rotary mechanism responsive to incoming start-stop signals for establishing in said devices a setting in accordance with the marking or spacing condition of each impulse of a line signal, a series of secondary storage members individually positionable and thereat latchable in accordance with the condition of said primary storage devices, a series of tertiary storage members, a rotary multiplex transmitting apparatus, and means responsive to said apparatus for transferring to said tertiary storage members the storage setting of said secondary members.

9. In a signal repeating mechanism, a first cam assembly having a full-revolution cycle of operation for performing signal distribution and dependent cam assembly control, a dependent cam assembly having a half-revolution cycle of operation, means under the joint control of a signal destination apparatus and said first cam assembly for releasing said dependent cam assembly to its cycle of operation, and a common rotary shaft for imparting rotation to both said first and dependent cam assemblies.

10. In a signal repeating mechanism, a first cam assembly having a full revolution cycle of operation for performing signal distribution and dependent cam assembly control, a dependent cam assembly having a partial cycle of operation, means under the joint control of a signal destination apparatus and said first cam assembly for releasing said dependent cam assembly to its cycle of operation, and a common rotary shaft for imparting rotation to both said first and dependent cam assemblies.

WALTER J. ZENNER.